(12) United States Patent
Schmidt et al.

(10) Patent No.: US 12,255,419 B2
(45) Date of Patent: Mar. 18, 2025

(54) PLUG CONNECTOR HOUSING, AND INJECTION-MOULDING METHOD AND INJECTION-MOULDING DEVICE FOR PRODUCING A PLUG CONNECTOR HOUSING

(71) Applicant: Rosenberger Hochfrequenztechnik GmbH & Co. KG, Fridolfing (DE)

(72) Inventors: Christian Schmidt, Surberg (DE); Alex Krejber, Laufen (DE); Michael Thaler, Traunwalchen (DE); Andreas Fischer, Eiselfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 375 days.

(21) Appl. No.: 17/963,218

(22) Filed: Oct. 11, 2022

(65) Prior Publication Data

US 2023/0113489 A1 Apr. 13, 2023

(30) Foreign Application Priority Data

Oct. 13, 2021 (EP) .................................... 21202474

(51) Int. Cl.
*H01R 13/447* (2006.01)
*H01R 13/627* (2006.01)

(52) U.S. Cl.
CPC ....... *H01R 13/6272* (2013.01); *H01R 13/447* (2013.01)

(58) Field of Classification Search
None
See application file for complete search history.

(56) References Cited

U.S. PATENT DOCUMENTS

| | | | | |
|---|---|---|---|---|
| 5,588,872 | A * | 12/1996 | Fukuda | H01R 13/641 439/489 |
| 7,052,318 | B2 * | 5/2006 | Tanaka | H01R 13/6272 439/595 |
| 9,017,108 | B2 * | 4/2015 | Suemitsu | H01R 13/4223 439/701 |

(Continued)

FOREIGN PATENT DOCUMENTS

| | | |
|---|---|---|
| DE | 19502387 A1 | 8/1995 |
| EP | 0812038 A2 | 12/1997 |
| JP | 2013068726 A | 4/2013 |

*Primary Examiner* — Tho D Ta
(74) *Attorney, Agent, or Firm* — Dickinson Wright PLLC (57) ABSTRACT

A plug connector housing for a plug connector, having a main body and a latching installation. The latching installation has a first connection portion integrally connecting the latching mechanism to the main body. A void extends along a longitudinal axis on the main body and is at least in portions formed between the latching installation and the main body. The plug connector housing furthermore has first and second protective elements which extend in each case integrally from the main body. The latching installation is disposed between the protective elements, wherein each of the protective elements in at least one covered region covers the void in a transverse direction. Each of the protective elements moreover configures at least one access region in which the void is accessible along the transverse direction. Each of the covered regions faces a respective access region of the respective other protective element along the transverse direction.

15 Claims, 5 Drawing Sheets

(56) References Cited

U.S. PATENT DOCUMENTS

| | | | |
|---|---|---|---|
| 9,318,836 B2 * | 4/2016 | Yagi | H01R 13/502 |
| 9,748,691 B2 * | 8/2017 | Soubh | H01R 12/716 |
| 2004/0248453 A1 | 12/2004 | McLauchlan et al. | |
| 2012/0282791 A1 | 11/2012 | Brown et al. | |
| 2015/0140853 A1 * | 5/2015 | Hashimoto | H01R 13/7032 |
| | | | 439/354 |
| 2018/0316131 A1 | 11/2018 | Holub et al. | |

* cited by examiner

PLUG CONNECTOR HOUSING, AND INJECTION-MOULDING METHOD AND INJECTION-MOULDING DEVICE FOR PRODUCING A PLUG CONNECTOR HOUSING

CROSS REFERENCE TO RELATED APPLICATION

This US Utility Patent Application claims the benefit of and priority to European Patent Application No. 21 202 474.9 filed on Oct. 13, 2021, the entire disclosure of which is incorporated herein by reference.

TECHNICAL FIELD

The invention relates to a plug connector housing for a plug connector, having a main body made from a plastics material, a latching installation for mechanically connecting to a corresponding mating latching installation of a mating plug connector, and a first protective element and a second protective element for the latching installation, according to the preamble of claim 1.

The invention moreover relates to a plug connector housing for a plug connector, having a main body made from a plastics material, a latching installation for mechanically connecting to a corresponding mating latching installation of a mating plug connector, and a protective bracket for the latching installation, according to the preamble of claim 11.

The invention furthermore relates to an injection-moulding method and to an injection-moulding device for producing a plug connector housing for a plug connector.

BACKGROUND OF THE INVENTION

Various optical and electrical plug connectors are known in the field of electrical engineering. As is known, plug connectors serve for transmitting supply signals and/or data signals to corresponding mating plug connectors. A plug connector, or the mating plug connector, respectively, can be a plug, a printed circuit board plug, a panel plug, a socket, a coupling or an adapter. The term "plug connector", or "mating plug connector", respectively, used in the context of the invention represents all variants.

A plug connection between plug connector and mating plug connector can in principle be held together by various mechanical connection techniques. A connection technique typically used is the latching mechanism between the plug connector and the mating plug connector. To this end, an elastic latching element can, for example, be configured externally on the plug connector housing, and a corresponding mating latching element can be configured externally on the mating plug connector housing.

Very high requirements are at times set in terms of the robustness and reliability of plug connectors. When in doubt, a plug connection thus must withstand high mechanical loads and remain closed in a defined manner such that the electrical connection is not unintentionally severed. Against this background, it has also to be ensured in particular that the participating latching installation of the plug connector is protected against damage, in particular during production, transport, assembly and/or later use of the plug connector, or of the plug connector housing, respectively.

Mechanical protective elements which, for example in the manner of protective walls or protective brackets, are disposed next to and/or above the latching installation on the plug connector housing are known as a protection of a latching installation. These protective elements are able to restrict or block access to the latching installation in a defined manner, this reducing the probability of mechanical damage. At the same time however, the accessibility of the latching installation for a technician and the corresponding mating latching installation has to be maintained.

In the production of plug connectors it has typically to be taken into account that a particularly economical manufacturing process is used in order for the plug connectors to be able to be produced in a cost-effective manner in the context of volume manufacturing. For this reason, an injection-moulding method is particularly advantageously suitable for producing plastic components of the plug connector housing.

However, if an injection-moulding method is to be used for producing the plug connector housing, the freedom of design of the plug connector housing is restricted because undercuts can be created as a result of the protective elements disposed laterally to and/or above the latching installations, and also as a result of the latching installation per se. Therefore, an injection-moulding method can at times not be used for all variants of design and combinations of latching installations and protective elements, or be implemented only by highly complex injection-moulding tools and demoulding procedures. Therefore, compromises in terms of the design of the latching installation and/or in terms of the protective elements have often to be made in order to enable cost-effective production by means of injection moulding in the first place.

SUMMARY OF THE INVENTION

In view of the known prior art, the object of the present invention lies in providing a plug connector housing for a plug connector, said plug connector housing having a particularly well protected and preferably robust latching installation and nevertheless preferably being able to be produced in a cost-effective manner in the context of an injection-moulding method.

The present invention is also based on the object of providing an injection-moulding method and an injection-moulding device for producing a plug connector housing, the latter having a particularly well protected and preferably robust latching installation.

In terms of the plug connector housing, the object is achieved by the features set forth in claim 1 or 11. In terms of the injection-moulding method, the object is achieved by the features of claim 12, and in terms of the injection-moulding device achieved by claim 15.

The dependent claims and the features described hereunder relate to advantageous embodiments and variants of the invention.

Provided is a plug connector housing for a plug connector, having a main body made, or configured from a plastics material.

The plug connector in the context of the invention can preferably be an electrical plug connector but optionally also an optical plug connector. For the purpose of simplification, the invention will be described hereunder substantially by means of the use of the plug connector housing for an electrical plug connector. However, this is not to be understood to be limiting.

The main body is preferably configured integrally from the plastics material, in particular by means of an injection-moulding method. Thermoplastics, thermosetting plastics and/or elastomers can preferably be used as plastics materials.

The main body can have one or a plurality of receptacles for further plug connector components of the plug connector, said receptacles extending along the longitudinal axis through the main body, so as to receive, for example, contact elements, shielding components, support sleeves and/or dielectrics.

Moreover, the main body can also have one or a plurality of fastening portions for fastening plug connector components, said fastening portions being disposed on the casing and/or the end side, so as to fasten further housing components of the plug connector to the main body, for example, in order to provide a plug connector housing which overall is in multiple parts. Therefore, the plug connector housing can comprise exclusively the main body and the components which are described hereunder and are integrally connected to the main body, but optionally also even further housing components of the plug connector (for example further plastics components or else metallic components, such as shielding elements, etc.).

The main body is preferably configured as a predominantly elongate component. However, the main body can also be configured so as to be angled, for example for use with an angular plug connector.

The main body preferably has a plug-proximal end which is provided for connecting to the mating plug connector and, therefore, can have a plug interface, for example, in particular a mechanically and/or magnetically coded plug interface to ensure that the connection to the mating plug connector can be performed only in an envisaged orientation, alignment and/or only by way of an envisaged mating plug connector.

Moreover, the main body preferably has an output-proximal end which faces away from the plug-proximal end and can be provided for connecting to an electrical or optical cable (in this context thus a cable-proximal end), but optionally also to any other electrical or optical supply line, such as an electrical conductor path of a printed circuit board (in this context thus a printed circuit board-proximal end).

According to the invention, the plug connector housing has a latching installation for mechanically connecting to a corresponding mating latching installation of a mating plug connector (in particular a corresponding mating latching installation of a mating plug connector housing of the mating plug connector). The latching installation, at least in portions, preferably extends along the longitudinal axis, or parallel to the longitudinal axis of the main body, respectively. The latching installation has a first connection portion by way of which the latching installation is integrally connected to the main body. A void, which extends along a longitudinal axis on the main body, is formed at least in portions between the latching installation and the main body.

A latching connection between the plug connector and the mating plug connector for securing the closed plug connection can thus be established by means of the latching installation and the corresponding mating latching installation. The latching connection between the latching installation and the mating latching installation is preferably releasable if required. The latching connection can optionally also be configured so as to be non-releasable such that a plug connection once closed can no longer be severed or opened in a non-destructive manner, respectively.

The latching installation and/or the mating latching installation are/is preferably at least in portions elastically configured so as to enable the latching action, or a snap-fitting action, respectively. Corresponding latching installations and mating latching installations are known in principle.

The latching installation is preferably a substantially elongate component which at least by way of the first connection portion is connected to the main body, wherein the first connection portion is preferably disposed on one of the two ends of the latching installation, for example on that end of the latching installation that faces the plug-proximal end of the plug connector housing. However, the first connection portion can also be disposed on that end of the latching installation that faces the output-side end of the plug connector, or be disposed in a central portion of the latching installation, i.e. between the two ends of the latching installation.

The first connection portion (and optionally also the second connection portion yet to be mentioned hereunder) preferably rises in the manner of a web from the main body and is configured so as to be preferably angled (in particular orthogonal) in relation to the remainder of the predominantly elongate latching installation. The latching installation is preferably configured on an outer surface of the main body. The latching installation, proceeding from the first connection portion and/or from the second connection portion, extends along the longitudinal axis of the void, preferably so as to be parallel to the outer surface of the main body that faces the latching installation.

According to the invention, the plug connector housing moreover has a first protective element and a second protective element. The first protective element is preferably but not necessarily disposed on a first side of the main body, and the second protective element is preferably but not necessarily disposed on a second side of the main body, opposite the first side.

The two protective elements are preferably configured on a longitudinal face of the main body on which the latching installation is also configured (hereunder also referred to as the "base area"). However, it is also conceivable that the two protective elements are in each case configured on one of the two mutually opposite longitudinal faces of the main body, said longitudinal faces each adjoining the longitudinal face, or the base area, respectively, on which the latching installation is configured. A combination, according to which one of the protective elements is configured on the base area and the other protective element is configured on the longitudinal face of the main body, is also possible.

According to the invention, the protective elements extend in each case integrally so as to proceed from the main body and such that the latching installation is disposed between the protective elements, wherein each one of the protective elements in at least one covered region covers the void configured between the latching installation and the main body in a transverse direction, the latter being transverse to the longitudinal axis.

The covered region preferably extends along the longitudinal axis of the void, particularly preferably so as to be parallel to the longitudinal axis of the void.

The transverse direction is preferably aligned so as to be orthogonal to the longitudinal axis of the void, but conjointly with the longitudinal axis of the void may optionally also include an angle which deviates from 90°.

The protective elements preferably protrude as elevations from the main body, for example as protective walls, protective webs and/or protective pins, as will yet be described hereunder. For example, the protective elements can be configured as elongate, rib-shaped elevations or protective walls having a longitudinal extent in the direction of the longitudinal axis of the void.

The two protective elements are able to cover the intervening latching installation in the transverse direction mentioned. The covering of the void and of the latching installation in the axial direction, and in the direction orthogonal to the axial direction, can in each case take place completely by the two protective elements. For various technical reasons, the latching installation in the axial direction and/or in a direction orthogonal to the axial direction is preferably in each case only partially covered.

The two protective elements preferably run on the two longitudinal edges, or the two longitudinal peripheries of the longitudinal face or the base area, respectively, of the main body on which the latching installation is also configured. The two protective elements on this longitudinal face of the main body can also be disposed so as to be mutually spaced apart tighter or wider than the lateral extent of the main body.

In order for the mobility of the latching installation to be optimized, a gap is in each case preferably provided between the latching installation and the two protective elements. It is to be pointed out here that the term "cover" in the context of the present invention is preferably not to be understood to mean coverage.

The protective elements are configured so as to provide at least in regions mechanical protection for the latching installation disposed between the protective elements, said mechanical protection proceeding in particular from the respective side on which the protective element is situated on the main body, and optionally also from above the latching installation by means of the protective bracket yet to be mentioned hereunder. To this end, the protective elements preferably cover at least the void, preferably however also at least partially or completely the latching installation per se, and as a result block undesirable mechanical access to the latching installation at least in the covered portions. Any mechanical influence which, proceeding from one of the two sides of the main body, may lead to damage or even destruction of the latching installation can therefore be precluded, or the respective risk can at least be sufficiently reduced.

The protective elements are preferably disposed parallel to or along the longitudinal axis of the void in such a manner that the latching installation is mechanically protected at least in particularly vulnerable and/or sensitive regions, for example in the region of a freely suspended end of the latching installation and/or in a central region between two attached ends of the latching installation.

It is provided according to the invention that each of the protective elements moreover configures at least one access region by way of which the void is accessible along the transverse direction, wherein each one of the covered regions faces a respective access region of the respective other protective element along the transverse direction.

The access region preferably extends along the longitudinal axis of the void, particularly preferably so as to be parallel to the longitudinal axis of the void.

The access region that lies opposite the respective covered region preferably extends at least along the entire axial extent of the assigned covered region and/or the transverse extent transverse to the axial extent of the covered region.

It can be provided that the protective elements are configured and positioned on the main body in such a manner that the covered regions of the void that are covered by one of the protective elements are accessible when proceeding from the opposite side on which the respective other protective element is positioned.

It can be provided that covered regions of the void that are covered by one of the protective elements are accessible when proceeding from the respective other protective element.

The protective elements can be configured on the main body in such a manner that each covered region that is covered by the first protective element is different or dissimilar, respectively, in comparison to each covered region that is covered by the second protective element.

It can be ensured according to the invention that the void is at all times accessible from at least one of the two sides of the main body, or from the first side of the main body and/or from the second side of the main body, respectively. Portions which by virtue of the first protective element are inaccessible from the first side of the main body, are therefore accessible when proceeding from the second side of the main body on which the second protective element is disposed, and vice versa.

The void between the latching installation and the main body, along the longitudinal axis of said void, is thus preferably not covered in the same manner by both sides in any portion; this means that the covered regions of the protective elements preferably do not overlap along the longitudinal axis of the void.

In this way, the production of the plug connector housing can be significantly simplified while maintaining an overall high protective effect of the protective elements.

For example, in the context of a production method of the plug connector housing it can be possible for the void to be generated by subtraction, or subtractive machining, respectively, while proceeding only from the sides. Particularly preferably however, it can be provided that the plug connector housing in the context of an injection-moulding method is produced by injection-moulding tools in which lateral demoulding of the void preferably takes place by going through the access regions.

The degree of freedom of design for the plug connector housing, in particular for advantageous combinations of latching installations and protective elements, can be significantly improved in comparison to the prior art.

It is to be mentioned at this point that a plurality of first protective elements and a plurality of second protective elements may optionally also be provided, wherein it would have to be taken into account in this case that the covered regions of the void that are conjointly covered by all first protective elements are accessible when proceeding from the opposite side on which the second protective elements are positioned, and vice versa.

In one advantageous refinement of the invention it can be provided that the latching installation has an elastic spring arm which runs along the longitudinal axis of the void and on which a latching element is disposed. Therefore, the latching installation can be configured in the manner of a "latching rocker".

The latching element is preferably a latching hook. The latching hook can be configured for establishing a latching connection with a corresponding mating latching element of the mating latching installation of the mating plug connector, for example so as to latch behind an edge, in a groove or in a clearance of the mating latching installation. The latching element can however also be an edge, a groove or a clearance in the spring arm, in which a corresponding latching hook of the mating latching installation of the mating plug connector is able to latch. In principle, a latching element of any arbitrary type may be provided in order to enable a releasable or non-releasable latching connection to the mating latching element of the mating plug connector.

The void is preferably disposed at least between the latching element of the latching installation and the main body so as to, proceeding from a basic state of the spring arm, enable a deflection of the latching element in the direction towards the main body (counter to the restoring force of the spring arm).

A latching element disposed on a spring arm can lead to a latching installation which is able to be operated in a particular simple manner by the technician. As a result of the axial extent of the spring arm, a sufficient elasticity and a sufficient lift for providing the latching connection can furthermore be provided even when the plug connector housing is of a comparatively small configuration.

The invention is particularly advantageously suitable for use with a latching installation which has an elastic spring arm with a latching element, because "latching rockers" of this type can be particularly susceptible in relation to mechanical damage, in particular in relation to mechanical damage proceeding from the sides of the main body, on the one hand, and because the latching rockers moreover typically have a comparatively complex construction with additional undercuts.

The spring arm can have an activation face which for a targeted deflection of the latching element can be activated by a technician, so as to deflect the latching element in the direction of the main body, counter to a restoring force of the spring arm, in order for the latching connection with the mating plug connector to be established or severed.

According to one refinement of the invention it can be provided that the spring arm on a first end, by way of the first connection portion, is integrally connected to the main body and moreover on a second end, facing away from the first end, by way of a second connection portion, is integrally connected to the main body.

The void along the longitudinal axis preferably extends across the entire length or extent, respectively, of the spring arm between the two connection portions.

The latching installation can thus be moulded in the shape of a spring arm, and by way of one end, or by way of both ends, be attached to the plug connector housing, or to the main body, respectively. As has already been mentioned above, a centric attachment of the latching installation, or of the spring arm, respectively, can however also be provided.

A particularly large lift for the latching connection can typically be implemented by a spring arm which is unilaterally attached to the main body. However, a latching connection of this type is also more susceptible in relation to external influences such as, for example, vibrations or other forces. In order for the robustness and the reliability of the plug connection to be further increased, a spring arm which is attached to the main body on both sides can therefore preferably be provided. In this instance, the latching element, in particular the latching hook, can be configured in the central portion between the two ends, or between the two connection portions, respectively. While the required plug-in force for plugging the plug connector into the mating plug connector may be increased as a result thereof, the holding force can however likewise be significantly improved. The decision whether an attachment of the spring arm, or the latching installation, respectively, is to be provided on one side on both sides can be taken by the person skilled in the art based on the specific application.

The invention is very particularly advantageously suitable for use with a latching installation attached on both sites, or with a spring arm attached on both sides, respectively, because a further undercut is created as a result, and accessibility of the void between the two connection portions is possible exclusively from the sides, thus transversely to the longitudinal axis of the void (in the transverse direction). An integral production, in particular in the context of an injection-moulding method, is therefore possible only by way of the proposed arrangement and design embodiment of the protective elements, unless the protective elements are to be dispensed with or the protective effect thereof is to be reduced.

According to one design embodiment of the invention it can be provided that the main body has an (outer) base area that connects the first side and the second side.

It can be provided that the protective elements and/or the connection portions extend so as to proceed from the base area and rise in particular orthogonally, or at least substantially orthogonally, from the base area.

The protective elements on the respective side of the main body can be directly adjacent to the periphery, or to the edge of the base area, respectively, and thus configure an extension of the lateral face of the respective side. An offset in relation to the periphery, or to the lateral faces on the base area, respectively, can however also be provided. The connection portions on a plug-proximal end side of the main body or on an output-proximal end side of the main body can be directly adjacent to the periphery, or the edge of the base area, respectively, and thus configure an extension of the respective end face of the main body. An offset in relation to the periphery, or to the end faces on the base area, respectively, can however also be provided.

It can also be provided that the protective elements are connected directly to a respective lateral face of the assigned side of the main body and/or that the connection portions are connected to the respective end face of the main body.

The void is preferably situated between the latching installation and the base area of the main body. The latching installation, by way of a face that faces the base area, preferably runs so as to be parallel to the base area.

According to one particularly preferred refinement of the invention it can be provided that at least one of the covered regions of one of the protective elements, preferably all covered regions of all protective elements, in addition to the void also at least in regions cover(s) the latching installation in the transverse direction, preferably parallel to the longitudinal axis of the void. A particular good protection can be provided for the latching installation in this way. In principle however, it may also already be sufficient to protect, or to cover, respectively, only the lateral access to the void below the latching installation.

It can be provided in principle that the protective elements completely cover the latching installation in a laterally alternating manner along the longitudinal axis. In one preferred refinement of the invention it can however be provided that the protective elements, in a front axial end portion that proceeds from a plug-proximal end, do not cover the latching installation in the transverse direction, or at least not laterally, respectively, and/or in a rear axial end portion that proceeds from an output-proximal end, do not cover the latching installation in the transverse direction, or at least not laterally, respectively.

The protective elements are preferably not disposed in the region of the plug-proximal end, or of the front axial end portion, respectively, or in the front axial end portion have corresponding access regions so as to provide an optimum accessibility of the plug interface for the connection to the mating plug connector, or so as to increase the degree of freedom in the design of the plug interface.

In one refinement of the invention it can be provided that the protective elements have respective elevations which for configuring a respective covered region run along the longitudinal axis of the void (preferably parallel to the longitudinal axis of the void and/or parallel to the opposite elevations of the respective other protective element).

The first protective element along or parallel to the longitudinal axis of the void can thus have one or a plurality of elevations (preferably exactly one elevation), and the second protective element along or parallel to the longitudinal axis of the void can have one or a plurality of elevations (preferably exactly one elevation).

It can moreover preferably be provided that the protective elements, have elevation-free regions (thus axial portions without any elevation) which, for configuring a respective access region, run along the longitudinal axis of the void (in particular elevation-free regions that run parallel to the longitudinal axis of the void).

It can thus be provided for example, that the elevation (or the elevations) of the first protective element along the longitudinal axis of the void, in particular parallel to the longitudinal axis of the void, is/are positioned so as to be offset in relation to the elevation (or the elevations) of the second protective element in such a manner that the covered regions of the void covered by the elevation (or the elevations) of one of the protective elements are accessible (in each case along the transverse direction) when proceeding from the opposite side on which the respective other protective element is positioned.

In this way, for example, a rear end portion of the latching installation (in particular a contiguous portion) that faces the output-proximal end can be laterally protected by the first protective element, and a portion of the latching installation that in the direction of the plug-proximal end lies further towards the front (in particular a contiguous portion that is directly adjacent to the rear end portion) can be laterally protected by the second protective element, or vice versa.

As has already been mentioned, a plurality of elevations, for example two, three, four, five or even more elevations, can be provided per protective element, wherein the protective elements also do not have to have the same number of elevations.

In one advantageous refinement of the invention it can moreover be provided that at least one of the elevations has at least one clearance (in particular a clearance that extends along the longitudinal axis of the void) so as to configure one of the access regions.

In principle, clearances which for providing the access region to the void are configured in elevations can provide better protection for the latching installation than a region which is completely elevation-free, because access can preferably also be restricted exclusively to the void in this way. The latching installation in this instance can continue to be completely protected or covered, respectively. It is however to be emphasized that the clearances can in principle be provided as an alternative, or else optionally also in addition to the mentioned elevation-free regions.

Each elevation can optionally also have a plurality of clearances, for example two, three, four or even more clearances.

The clearances on the mutually opposite protective elements can optionally also overlap along the longitudinal axis of the void. In this way, portions of the void can even be rendered so as to be accessible from both sides.

According to one refinement of the invention it can be provided that at least one of the elevations is configured as a protective wall or protective web.

Protective walls are preferably provided, in particular exactly one protective wall per protective element. However, the use of protective webs can likewise lead to an advantageous lateral protection of the latching installation. For example, the protective webs can be distributed on the main body in the manner of castellations or teeth along the longitudinal axis of the void (in particular parallel to the longitudinal axis of the void).

As an alternative to protective walls or protective webs, protective ribs, protective bars or protective pins can also be provided, which rise from the main body laterally beside the latching installation and are correspondingly distributed along the longitudinal axis of the void (in particular parallel to the longitudinal axis of the void) such that the void in each portion along the longitudinal axis of the void is accessible from at least one side of the main body.

In one preferred refinement of the invention it can be provided that at least one of the clearances is configured as a window, concavity or slot.

One design embodiment of the protective element having protective walls with correspondingly mutually positioned windows for configuring the covered region/access region combination can provide a particularly high protective effect for the latching installation while maintaining good accessibility to the void and thus the possibility of a cost-effective production of the plug connector housing, in particular in the context of an injection-moulding method.

In one refinement of the invention it can be provided that the plug connector housing has a protective bracket which has a first leg and a second leg, wherein the first leg is integrally connected to the first protective element, and the second leg is integrally connected to the second protective element. The protective elements can also configure the legs of the protective bracket; a leg of the protective bracket and a protective element can therefore also be the same functional component.

The protective bracket preferably bridges the latching installation in order for said latching installation to be mechanically protected. To this end, the protective bracket can extend in particular from the first protective element to the second protective element.

A protective bracket can advantageously prevent mechanical damage to the latching installation from above, thus in the direction of the base area of the main body. Corresponding protective brackets are also known by the term "rocker brackets". The protective bracket preferably bridges the latching installation in the region of the maximum elevation of said protective bracket along the longitudinal axis.

Exactly one protective bracket is preferably provided. However, a plurality of protective brackets, for example two, tree, four, five or even more protective brackets, which are disposed so as to be distributed along the longitudinal axis of the void can also be provided.

The protective bracket can provide a closed connection between the two protective elements; this is however not mandatory. For example, only semi-brackets, which proceed from a respective leg, or a respective protective element, respectively, and—while not being interconnected—conjointly form the protective bracket can also be provided. A protective bracket which is unilaterally connected to the main body can also be provided; one of the legs of the protective bracket can thus also be spaced apart from the main body, for example in order for the access region to be configured.

The protective bracket can in particular extend so as to proceed from protective elements configured as lateral walls or ribs, or else so as to proceed from protective elements configured as webs or pins. The legs of the protective bracket can already per se configure the respective protective element (for example a protective web), wherein an additional protective web or a protective wall is no longer required in this instance.

In one advantageous refinement it can be provided that the legs of the protective bracket are positioned so as to be mutually offset along the longitudinal axis of the void, in particular in order to ensure that the legs do not cover the void on both sides.

However, it can also be provided that the legs are positioned so as not to be mutually offset along the longitudinal axis of the void, in particular when the legs extend so as to proceed from protective elements, or are placed on protective elements (in particular protective walls) that have clearances (for example, windows) in order to guarantee the accessibility of the void.

When the legs of the protective bracket are disposed so as to be mutually offset, the protective bracket between the two legs preferably follows a curved profile (for example in the manner of an S-curve). This is however not absolutely necessary; a linear or stepped profile may also be provided.

In the context of the inventive overall concept, the invention moreover relates to a plug connector housing for a plug connector, having
a main body made, or configured from a plastics material;
a latching installation for mechanically connecting to a corresponding mating latching installation of a mating plug connector, wherein the latching installation has a first connection portion by way of which the latching installation is integrally connected to the main body, wherein a void, which extends along a longitudinal axis on the main body, is at least in portions formed between the latching installation and the main body; and
a protective bracket which has a first leg and a second leg, wherein at least one of the legs extends integrally so as to proceed from the main body, and wherein the latching installation is disposed between the legs and is bridged by the protective bracket in order for said latching installation to be mechanically protected, and wherein at least that leg that is integrally connected to the main body in at least one covered region covers the void, which is configured between the latching installation and the main body, in a transverse direction transverse to the longitudinal axis.

The covered region preferably extends along the longitudinal axis of the void, particularly preferably so as to be parallel to the longitudinal axis of the void.

The above-mentioned plug connector housing (thus the plug connector housing according to claim 11) for reasons of distinguishability from the plug connector housing of claim 1 hereunder is occasionally also referred to as the "alternative plug connector housing". However, it is to be emphasized that, unless otherwise stated, the statements above and hereunder in the description, the claims and the figures may refer equally to the plug connector housing of claim 1 and to the "alternative plug connector housing" of claim 11; this applies in particular (but not exclusively) to features and advantages of the main body, the latching installation, the void and the protective bracket.

In terms of the alternative plug connector housing it is provided that a) at least one of the legs configures at least one access region by way of which the void is accessible along the transverse direction, wherein one of the access regions of the respective other leg lies opposite each covered region along the transverse direction; and/or
b) the legs are disposed so as to be mutually offset, preferably disposed so as to be axially offset along the longitudinal axis of the void such that the void covered in the transverse direction by one of the legs, proceeding from the other leg is accessible along the transverse direction.

The access region preferably extends along the longitudinal axis of the void, particularly preferably parallel to the longitudinal axis of the void.

This alternative plug connector housing represents an alternative solution for the unitary object according to the invention, said alternative plug connector housing presently being expediently presented separately. The two plug connector houses are related to one another to the extent that it is ensured that the void between the latching installation and the main body parallel to the longitudinal axis of the main body is at all times accessible at least from one side along the transverse direction in that the structures provided for the protection of the latching installation configure covered regions and access regions which are mutually adapted in a corresponding manner. The method, yet to be mentioned hereunder, and the device can therefore also be used for advantageously producing the two plug connector housings by means of the mentioned injection-moulding process.

The invention also relates to an injection-moulding method for producing a plug connector housing for a plug connector, comprising at least the following method steps:
providing a multiple-part injection moulding tool which in the assembled state thereof configures a female mould for one of the plug connector housings mentioned above and hereunder;
moving a first casting mould of the injection-moulding tool along the longitudinal axis of the void relative to the plug connector housing so as to demould axial regions between the latching installation and the protective elements; and
moving a second casting mould and a third casting mould, which lies opposite the second casting mould, of the injection-moulding tool in each case along the transverse direction relative to the plug connector housing so as to demould the void between the latching installation and the main body by going through the access region.

The substantial demoulding of the plug connector housing, in particular the demoulding of the latching installation, here can thus advantageously take place in a direction transverse to the longitudinal axis of the void, thus in a lateral direction. The demoulding tool, or the demoulding regions, respectively, of the respective casting mould can be guided through the above-mentioned window, for example, or through any other clearance in the protective wall, or guided past a protective wall.

As is known, the term "demoulding" in the context of the injection-moulding refers to the releasing the product, which is at least already partially solidified, from the casting mould, or from the injection-moulding tool, respectively. To this end, the casting moulds can be moved away from the product, or from the plug connector housing, and the plug connector housing can be ejected from the casting mould by an ejection means. This process can be extraordinarily complex in the case of correspondingly complex shapes.

In contrast, demoulding of the plug connector housing in the transverse direction, or from the first side and from the second side of the main body, respectively, can be made possible in a particularly simple manner as a result of the proposed method, wherein a high degree of freedom in terms of the design of the plug connector housing is maintained at the same time, and a plug connector housing which has a spring arm attached on both sides and at the same time has particularly good lateral and upper mechanical protection can be provided, for example. As a result of demoulding being able to take place in the transverse direction, or from the sides, respectively, particularly simple casting moulds, or a particularly simple injection-moulding tool, respectively, can be provided.

Moreover, a region above the latching installation and, if applicable, the clearance for the plug connection components which is optionally configured in the main body, can be demoulded by means of the first casting mould.

Moreover, the plug-proximal end, or the front end portion, respectively, or an output-proximal end, or the rear end portion, respectively, of the main body can optionally be demoulded solely in the transverse direction, or demoulded while proceeding from the side, respectively, as well as portions of the respective protective element (for example windows of the latter, clearances, voids between the individual webs of protective walls, etc.) or a protective web, by means of the second and/or the third casting mould. In particular, a front end portion of the latching installation can be demoulded by means of the first and/or the second casting mould.

In one advantageous refinement of the invention it can be provided that the first casting mould is used (preferably used exclusively) for demoulding the axial regions between the latching installation and the protective elements, in a rear axial end portion that proceeds from an output-proximal end, along the longitudinal axis of the void.

Demoulding of the plug-proximal end, or the front end portion, respectively, of the plug connector in the transverse direction, or from the side, respectively (as opposed to demoulding in the direction of the longitudinal axis of the void) can be advantageous because the plug connector housing in this case can also have further undercuts on the plug-proximal end thereof, for example as a result of a latching hook and/or a mechanical coding means. The front end portion of the main body that proceeds from the plug-proximal end is thus preferably not demoulded from the first casting mould. This front axial end portion is preferably demoulded from the side from the second casting mould and/or the third casting mould.

It can furthermore be provided that the first casting mould is used (preferably used exclusively) for demoulding the axial regions between the latching installation and the protective elements, in a front axial end portion that proceeds from a plug-proximal end, along the longitudinal axis of the void. It can thus preferably also be provided that the output-proximal end, or the rear end portion, respectively, of the plug connector is demoulded in the transverse direction, or from the side, while using the second casting mould and/or the third casting mould and not the first casting mould.

In one development of the invention it can be provided that the second casting mould and the third casting mould are moved temporally synchronously in order to demould the void simultaneously by going through the access regions of all protective elements, thus simultaneously from both sides.

Moreover, the first casting mould is preferably moved so as to be temporally synchronized with the second casting mould and with the third casting mould.

The process time can be reduced as a result of the temporally synchronous movement of a plurality of casting moulds. A temporally synchronized or simultaneous movement, respectively, of the casting moulds is possible in particular because the proposed design embodiment of the plug connector housing reduces the requirements set for the injection-moulding tool and therefore simplifies the demoulding process.

The invention also relates to an injection-moulding device for producing a plug connector housing for a plug connector, having a multiple-part injection-moulding tool which in the assembled state thereof configures a female mould for a plug connector housing mentioned above and hereunder, wherein a first casting mould of the injection-moulding tool for demoulding the plug connector housing is movable along the longitudinal axis of the void relative to the plug connector housing so as to demould axial regions between the latching installation and the protective elements, and wherein a second casting mould and a third casting mould of the injection-moulding tool for demoulding the plug connector housing are in each case movable along the transverse direction relative to the plug connector housing and are disposed so as to be mutually opposite in order for the void between the latching installation and the main body to be demould and by going through the access regions.

The injection-moulding tool of the proposed injection-moulding device is according to the invention particularly efficient and productive because the demoulding is facilitated. In this way, fewer tool slides may be required, and the freedom of design in terms of the production of the plug connector housing can moreover be higher.

The second casting mould and the third casting mould are preferably configured to engage with respective demoulding regions for the void between the latching installation and the main body, when the casting moulds are converged, or when the injection-moulding tool is closed, respectively. For example, the second casting mould can have two demoulding regions that are mutually spaced apart along the longitudinal axis, and the third casting mould can have a demoulding region between the demoulding regions of the second casting mould.

The second casting mould and the third casting mould can moreover be configured for laterally demoulding regions outside the void, for example the legs of the protective bracket and/or the protective bracket.

In principle, even further casting moulds can be provided apart from the first, the second, and the third casting mould, for example a fourth casting mould for demoulding a clearance for plug connector components that extends longitudinally through the main body, or for demoulding further portions or regions of the main body, respectively. Preferably however, a three-part injection-moulding tool as described above is provided.

In order for the movement of the casting moulds to be implemented, corresponding tool slides can be provided, which are coupled to a respective actuator installation, for example an electrically, pneumatically and/or hydraulically driven linear actuator.

The movement between the respective casting mould and the plug connector housing can be performed by a movement of the casting mould and/or by a movement of the plug connector housing. In principle, only a relative movement between the respective casting mould and the plug connector housing is relevant. Preferably however, the respective casting mould is moved and it is optionally ensured by one or a plurality of ejection means that the plug connector housing is actually ejected from the injection-moulding tool as a result of the removal of the casting moulds.

The invention also relates to a plug connector, in particular an electrical plug connector, having one of the plug connector housings according to the embodiments above and hereunder.

The invention moreover relates to a plug connection having the plug connector mentioned above, and the mating plug connector.

The plug connector, or the plug connection, respectively, can particularly advantageously be used within a vehicle, in particular a motor vehicle. Potential fields of applications are autonomous driving, driver assistance systems, navigation systems, infotainment systems, rear entertainment system, internet connections and wireless Gigabit (IEEE 802.11ad standard). Potential applications relate to high-resolution cameras, for example 4K and 8K cameras, sensors, onboard computers, high-resolution display screens, high-resolution dashboards, 3-D navigation apparatuses and mobile transceivers. The term "vehicle" here describes any transportation means, in particular overland vehicles, watercraft or aircraft, including aerospace vehicles. The plug connector according to the invention is fundamentally suitable for any arbitrary applications within the entire field of electrical engineering and is not to be understood to be limited to the use in automotive engineering.

The plug connector is not limited to a specific type of plug connector, wherein the invention is particularly suitable for plug connectors and plug connections for the high-frequency sector. These can be in particular plug connectors or plug connections, respectively, of the type PL, BNC, TNC, SMBA (FAKRA), SMA, SMB, SMS, SMC, SMP, BMS, HFM (FAKRA-Mini), H-MTD, BMK, Mini-Coax or MATE-AX.

Features which have been described in the context with one subject matter of the invention, specifically represented by one of the plug connector housing, the plug connector, the plug connection, the injection-moulding method and the injection-moulding device according to the invention, can also be advantageously implemented for the other subject matter of the invention. Likewise, advantages which have been mentioned in the context of one subject matter of the invention can also be understood to relate to the other subject matter of the invention.

It is to be additionally pointed out that terms such as "comprising", "having" or "with" do not preclude any other features or steps. Furthermore, terms such as "alone" or "the", which suggest a singularity of steps or features, do not preclude a plurality of steps or features, and vice versa.

In a puristic embodiment of the invention, it may however also be provided that the features introduced in the invention by the terms "comprising", "having" or "with" constitute an exhaustive list. Accordingly, in the context of the invention, one or more enumerations of features can be considered in self-contained form, for example considered respectively for each claim. For example, the invention can be composed exclusively of the features mentioned in claim 1.

It is to be noted that terms such as "first" or "second" etc. are used predominantly for the sake of distinguishability between respective device or method features, and are not imperatively intended to indicate that features are mutually dependent or relate to one another.

It is furthermore emphasized that the values and parameters described in the present case also encompass deviations or fluctuations of ±10% or less, preferably ±5% or less, more preferably ±1% or less, and very particularly preferably ±0.1% or less, of the respectively stated value or parameter, if such deviations are not ruled out in practice in the implementation of the invention. The specification of ranges by way of start and end values also encompasses all values and fractions encompassed by the respectively stated range, in particular the start and end values and a respective mean value.

BRIEF DESCRIPTION OF THE FIGURES

Exemplary embodiments of the invention will be described in more detail hereunder by means of the drawings.

The figures show in each case preferred exemplary embodiments in which individual features of the present invention are illustrated in combination with one another. Features of one exemplary embodiment can also be implemented independently of the other features of the same exemplary embodiment and can accordingly be readily combined with features of other exemplary embodiments by a person skilled in the art so as to form further expedient combinations and sub-combinations.

Functionally equivalent elements are provided with the same reference signs in the figures.

In a schematic manner.

DETAILED DESCRIPTION OF THE ENABLING EMBODIMENTS

Figure 1:
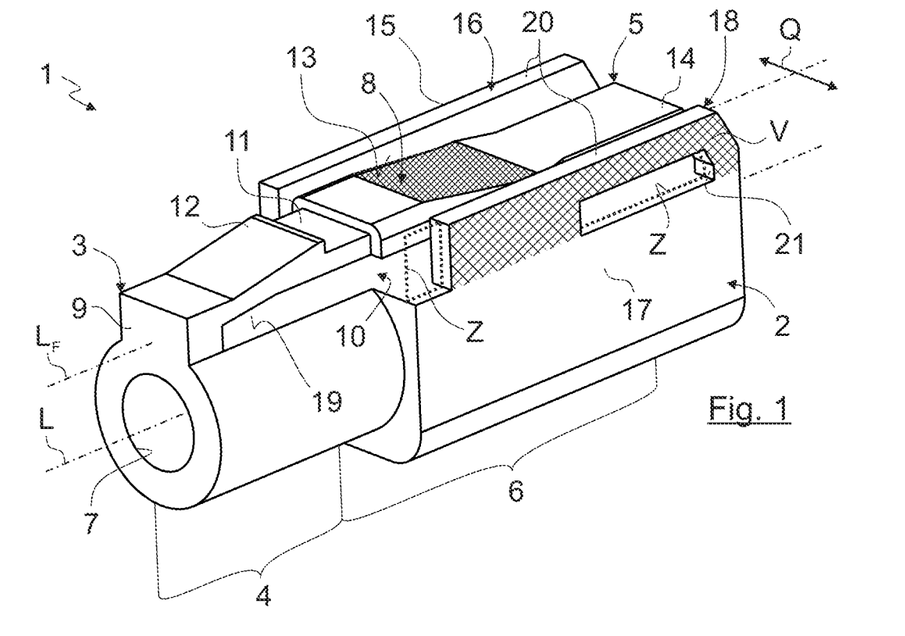
FIG. 1 shows a plug connector housing according to a first exemplary embodiment of the invention, having protective walls, in a perspective illustration.
Figure 2:
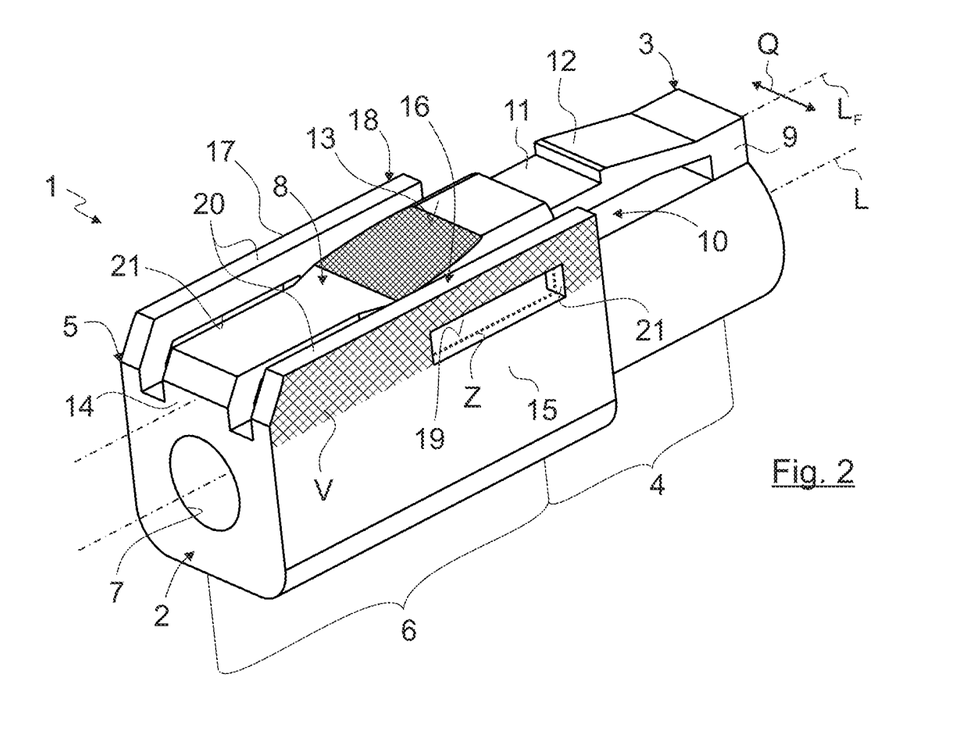
FIG. 2 shows the plug connector housing of FIG. 1 in a further perspective illustration.

FIGS. 1 and 2 show a plug connector housing 1 for a plug connector according to a first exemplary embodiment of the invention. In the context of the invention, a plug connector can be an electrical plug connector or else optionally an optical plug connector.

Shown in the exemplary embodiments are integrally configured plug connector housings 1 which may optionally also have further components such as, for example, metallic shieldings or additional plastic components.

The plug connector housing 1 has a main body 2, made from a plastics material, which extends along a longitudinal axis L. The main body 2 in the exemplary embodiments is configured as a predominantly elongate component. In principle however, an angled main body 2, or an angled plug connector, respectively, may also be provided.

The main body 2 has a plug-proximal end 3, proceeding from which a front end portion 4 of the plug connector housing 1 extends along the longitudinal axis L. This front end portion 4 is predominantly provided for contacting the mating plug connector housing of the mating plug connector (not illustrated), thus configuring the plug interface. An output-proximal end 5 of the main body 2, or a rear end portion 6, respectively, is presently provided for connecting to an optical or electrical cable (not illustrated). Alternatively, a connection to a conductor path, for example, or to other lines of an electric circuit (likewise not illustrated), can also be provided.

By way of example, the main body 2 has a clearance 7 for receiving plug connector components, not illustrated, such as contact elements or dielectrics, for example.

The plug connector housing 1, in particular the main body 2 and the components which are integrally connected to the main body 2 and are yet to be described hereunder, are preferably produced by means of the injection-moulding method described hereunder.

For mechanically latching to a mating plug connector, the plug connector housing 1 has a latching installation 8 which extends parallel to the longitudinal axis L of the main body 2 and which has a first connection portion 9 by way of which said latching installation 8 is integrally connected to the main body 2. A void 10, which extends along a longitudinal axis $L_F$, is configured between the latching installation 8 and the main body 2.

In the exemplary embodiments, the latching installation 8 is configured as an elastic spring arm 11 which runs parallel to the longitudinal axis L of the main body 2, or parallel to the longitudinal axis $L_F$ of the void 10, respectively, and on which a latching element configured as a latching hook 12 is disposed. The possibility of deflecting the latching element, or the latching hook 12, respectively, proceeding from a basic state of the spring arm 11 in the direction of the main body 2 so as to enable latching and unlatching with/from the mating plug connector is provided by the void 10 between the latching hook 12 and the main body 2. A fluted activation face 13 is typically provided for an activation of the latching installation 8, or of the spring arm 11, respectively, by a technician.

Figure 3:
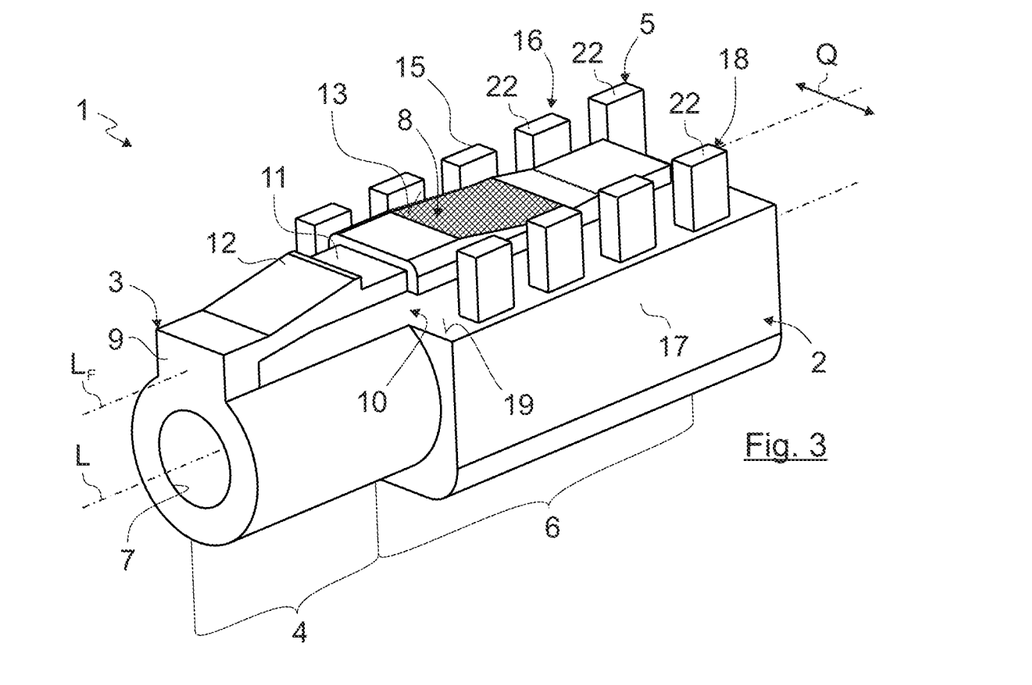
FIG. 3 shows a plug connector housing according to a second exemplary embodiment of the invention, having protective webs, in a perspective illustration.
Figure 4:
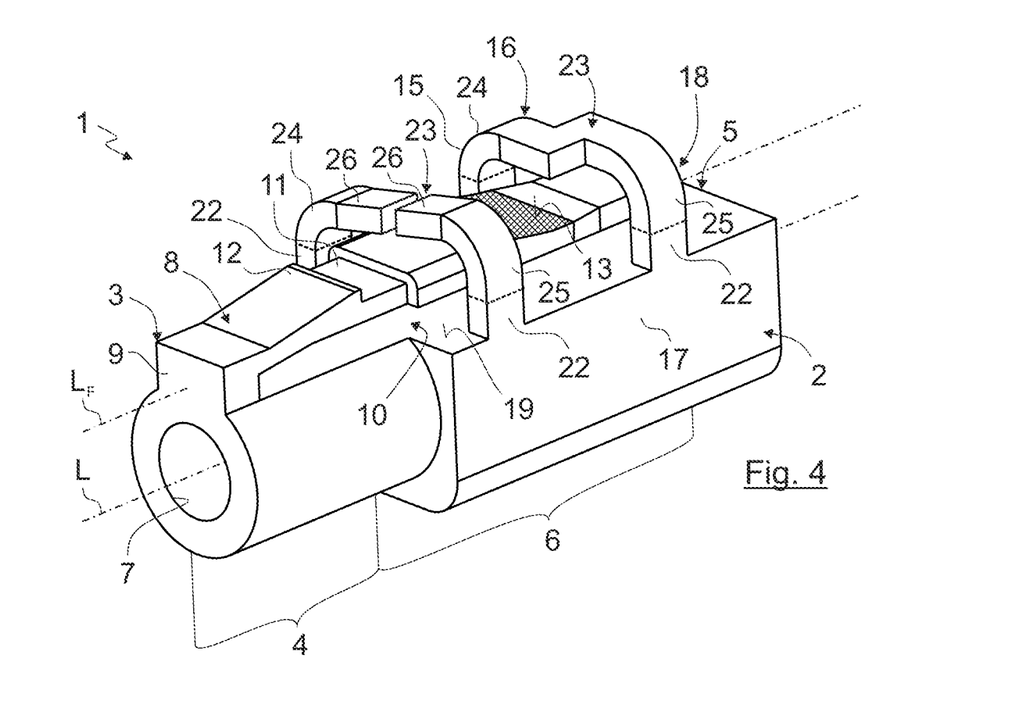
FIG. 4 shows a plug connector housing according to a third exemplary embodiment of the invention, having two exemplary protective brackets, in a perspective illustration.

In the exemplary embodiments of the plug connector housing 1 shown in FIGS. 1, 2, 5 and 6, the spring arm 11, apart from the first connection portion 9, moreover has a second connection portion 11 so as to likewise connect the spring arm 11 on the second end, facing away from the first end, to the main body 2. The void 10 along the longitudinal axis $L_F$ here extends across the entire length between the two connection portions 9, 14. A latching installation 8 which is attached on both sides, or a spring arm 11 which is attached on both sides, respectively, is provided in this way, this potentially increasing the robustness of the latching connection. However, a spring arm 11 which is attached only on one side can likewise be provided, as is illustrated in FIGS. 3, 4 and 7.

The plug connector housing 1 for a mechanical protection of the latching installation 8 has a first protective element 16, which is disposed on a first side 15 of the main body 2, and a second protective element 18, which is disposed on a second side 17 of the main body 2, wherein the protective elements 16, 18 in each case extend integrally so as to proceed from the main body 2. The latching installation 8, or the spring arm 11, respectively, is disposed between the protective elements 16, 18 in such a manner that each one of the protective elements 16, 18 in at least one covered region V (cf. hatched areas in FIGS. 1 and 2) covers the void 10, which is configured between the latching installation 8 and the main body 2, proceeding from the respective side 15, 17, or in a transverse direction Q, the latter being transverse to the longitudinal axis $L_F$ of the void 10.

The protective elements 16, 18 presently extend so as to proceed from a base area 19 of the main body 2, which connects the first side 15 and the second side 17 and by way of which the connection portions 9, 14 are also connected. The void 10 is situated between the latching installation 8 and the base area 19. The protective elements 16, 18 rise predominantly orthogonally from the base area 19 and run on the periphery of the main body 2, or of the base area 19, respectively, in such a manner that said protective elements 16, 18 represent an extension of the lateral face of the respective side 15, 17. However, it can also be provided that the protective elements 16, 18 and/or the connection portions 9, 14 are spaced apart from the respective periphery of the main body 2, as this is highlighted purely by way of example by means of the protective elements 16, 18 of FIG. 3.

In order for the latching installation 8 to be ideally comprehensively protected, the covered regions V of the protective elements 16, 18, in addition to covering the void 10, are moreover configured for at least in regions covering the latching installation 8 in the transverse direction Q.

It can be provided that the protective elements 16, 18 in the front end portion 4 which proceeds from the plug-proximal end 3, do not laterally cover the latching installation 8 along the longitudinal axis L of the main body 2, or the longitudinal axis $L_F$ of the void 10, as is illustrated in all exemplary embodiments. The accessibility of the plug connector housing 1 for the mating plug connector housing can be improved as a result.

It is provided in the context of the invention that the protective elements 16, 18 moreover configure in each case at least one access region Z by way of which the void 10 is accessible along the transverse direction Q. In order to ensure that the void 10 along the longitudinal axis $L_F$ is in each case accessible at least when proceeding from a side 15, 17, or from one of the protective elements 16, 18, respectively, the protective elements 16, 18 are disposed and configured on the main body 2 in such a manner that respectively one of the access regions Z of the respective other protective element 18, 16 lies opposite each covered region V in the transverse direction Q. In this way, the void 10, while proceeding from the first side 15 and/or the second side 17, is thus at all times fully accessible along the longitudinal axis $L_F$. Should the accessibility proceeding from one side 15, 17 be blocked, the accessibility from the other side 17, 15 is nevertheless assured. In order for this to be made possible, the protective elements 16, 18 can be configured in various ways. Some possibilities are explained in the context of the present exemplary embodiments—occasionally in combination with one another, but the invention is not to be limited thereto.

In the exemplary embodiments illustrated in FIGS. 1, 2, 5 and 6, the protective elements 16, 18 have respective protective walls 20. The protective wall 20 of the second protective element 18 along the longitudinal axis $L_F$ of the void 10 is shortened, or positioned at an offset, respectively, in relation to the protective wall 20 of the first protective element 16 in such a manner here that a covered region V of the void 10, that is covered by the protective wall 20 of the first protection element 16, is accessible while proceeding from the second side 17 on which the second protective element 18 is positioned. The second protective element 18, in the front axial portion thereof that faces the plug-proximal end 3 of the main body 2, thus has an elevation-free or protective wall-free region, respectively, which extends along the longitudinal axis $L_F$ of the void 10 so as to configure one of the access regions Z.

Additionally, the protective walls 20 have respective clearances which are configured as windows 21, so as to in each case configure a further access region Z in order to correspondingly render accessible the void 10 between the latching installation 8 and the main body 2 along the transverse direction Q. The window 21 of the first protective element 16 along the longitudinal axis $L_F$ of the void 10 here is positioned so as to be offset from the window 21 of the second protective element 18 in such a manner that are covered regions V of the void 10 again remain selectively accessible from at least one of the two sides 15, 17.

An alternative or else an addition to protective elements 16, 18 that have protective walls 20 is illustrated in FIG. 3. It is provided here that the protective elements 16, 18 have respective protective webs 22 which are preferably distributed in the manner of castellations on the main body 2, wherein the protective webs 22 of the first protective element 16 along the longitudinal axis $L_F$ of the void are positioned so as to be offset from the protective webs 22 of the second protective element 18 in such a manner that the covered regions V of the void 10, which are covered by the protective webs 22 of one of the protective elements 16, 18, are accessible while proceeding from the opposite side 17, 15 on which the respective other protective element 18, 16 is positioned. The respective access regions Z are thus implemented by the respective elevation-free regions between the protective webs 22. A good protection for the latching installation 8 can also be provided in this way.

An additional or alternative possibility for protecting the latching installation 8 is the use of a protective bracket 23, as is illustrated in FIGS. 4 to 7. Shown by way of example in FIG. 4 is an exemplary embodiment of a plug connector housing 1 having two protective brackets 23, the latter for highlighting the design of freedom being of dissimilar designs. The use of only a single protective bracket (cf. FIG. 7) or of more than two protective brackets 23 in an identical design embodiment or in dissimilar design embodiments can also be provided.

A protective bracket 23 preferably has a first leg 24 and a second leg 25, wherein the first leg 24 is integrally connected to the first protective element 16, and the second leg 25 is integrally connected to the second protective element 18. Therefore, the protective elements 16, 18 can also directly configure the legs 23, 24.

The legs 24, 25 can run so as to proceed from one of the protective walls 20 shown above (cf. FIGS. 5 and 6), for example, or so as to proceed from protective webs 22 as is indicated by dashed lines in FIG. 4. The protective bracket 23 ultimately extends from the first protective element 16, or from the first leg 24, respectively, to the second protective element 18, or to the second leg 15, respectively and bridges the latching installation 8 in order for the latter to be mechanically protected. As is derived by means of the front protective bracket 23 according to FIG. 4, it is also not required to this end that the protective bracket 23 has a closed profile. The protective bracket 23 can also be configured by two semi-brackets 26 which, proceeding from the respective leg 24, 25, extend towards one another. A protective bracket 23 which is connected to the main body 2 only on one side can also be provided, as is illustrated in FIG. 7.

Figure 5:
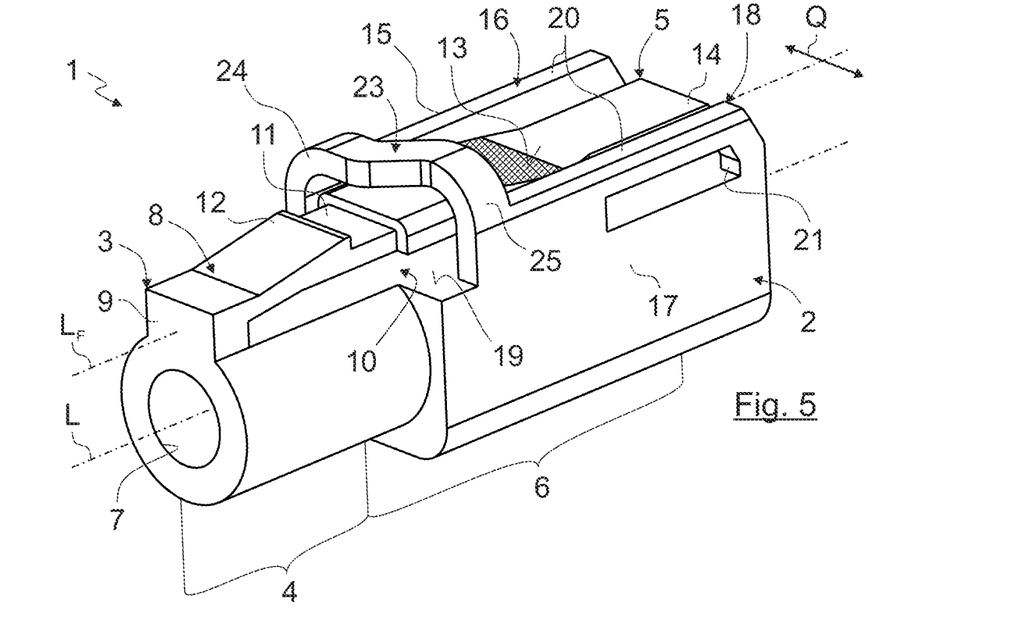
FIG. 5 shows a plug connector housing according to a preferred fourth exemplary embodiment of the invention, having protective walls and a protective bracket, in a perspective illustration.
Figure 6:
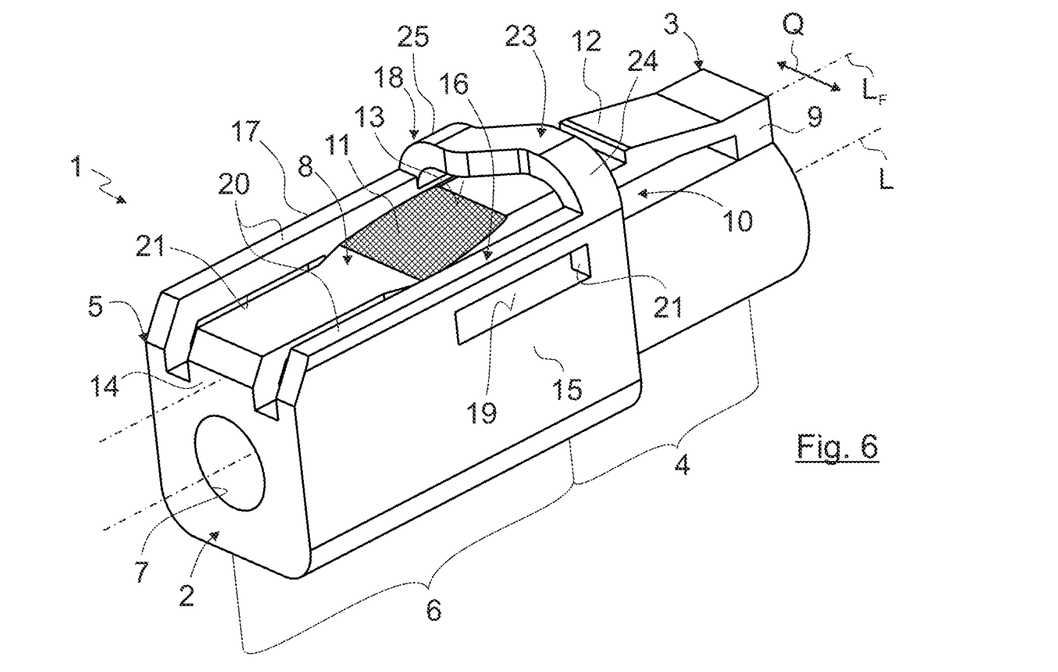
FIG. 6 shows the plug connector housing of FIG. 5 in a further perspective illustration.
Figure 7:
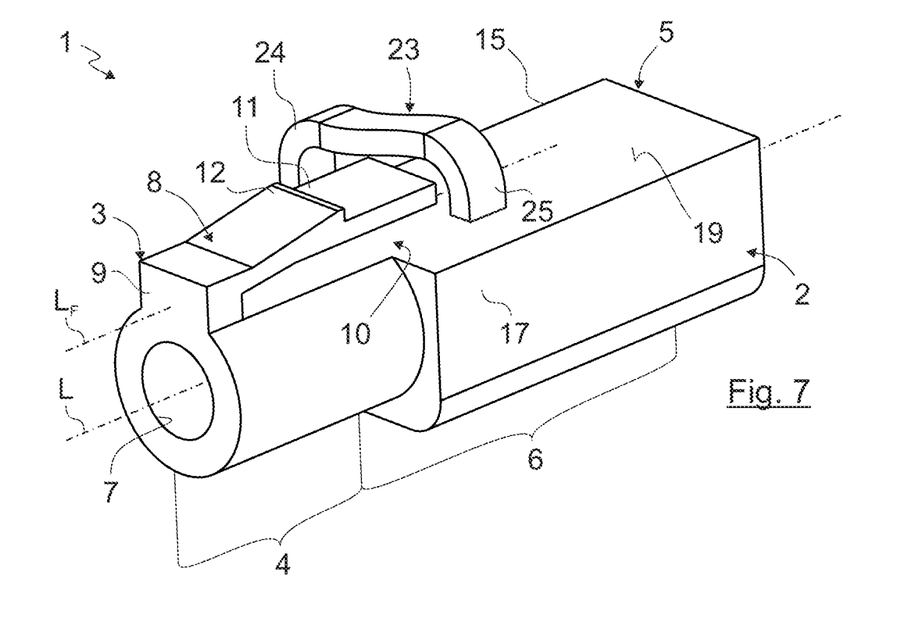
FIG. 7 shows the alternative plug connector housing according to an exemplary embodiment of the invention, having a unilaterally attached protective bracket, in a perspective illustration.

Should this be required, the legs 24, 25 of the protective bracket 23 can be positioned so as to be mutually offset along the longitudinal axis $L_F$ of the void 10, as is illustrated in FIGS. 4 to 6. However, should the protective bracket 23 be placed only onto one of the protective walls 20 or on one of the protective webs 22, a disposal of the legs 24, 25 which is not offset may optionally also be provided, in particular when the respective protective wall 20 and/or the respective protective web 23 have/has a window 21 or any other clearance in order to guarantee the accessibility to the void 10.

Should the two legs 24, 25 of the protective bracket 23 be mutually offset along the longitudinal axis $L_F$, a curved profile of the protective bracket 23 between the two legs 24, 25 can preferably be provided, as is illustrated in the preferred exemplary embodiment of FIGS. 5 and 6. In principle however, alternative profiles such as a linear profile (cf. front protective bracket 23 in FIG. 4) or a stepped profile (cf. rear protective bracket 23 of FIG. 4) may also be provided.

FIGS. 5 and 6 show a plug connector housing 1 according to a particularly preferred exemplary embodiment of the invention. The plug connector housing 1 has a spring arm 11 which is attached on both sides and is laterally protected by the respective protective walls 20, wherein the second protective element 18 for configuring one of the access regions Z again has a front, elevation-free region, thus along the longitudinal axis $L_F$ of the void 10 is shortened in relation to the first protective element 16 and is offset in the direction towards the output-proximal end 5 of the main body 2. Furthermore, the protective elements 16, 18 have respective clearances in the manner of windows 20, so as to provide further access regions Z which correspond to respective opposite covered regions V. Furthermore, the latching installation 8 shown in FIGS. 5 and 6 is also protected from above as a result of the protective bracket 23 placed onto the protective walls 20. A plug connector housing 1 such as illustrated in FIGS. 5 and 6 is able to provide a particularly advantageous protection for the latching installation 8 and at the same time is able to be produced in a cost-effective manner in the context of volume production by means of an injection-moulding method.

In order to highlight that an alternative plug connector housing 1, having only one or a plurality of protective brackets 23, can also be provided in the context of the inventive overall concept, such an alternative plug connector housing 1 is additionally shown by way of example in FIG. 7. It is to be emphasized here that the further features and advantages of the respective plug connector housings 1 shown in the exemplary embodiments and the figures can in principle also be applied to the alternative plug connector housing 1, and vice versa.

The plug connector housing 1 shown in FIG. 7 also has a main body 2, made from a plastics material, and a latching installation 8 for mechanically connecting to a corresponding mating latching installation of a mating plug connector, said latching installation 8 being able to be configured as already explained. The alternative plug connector housing 1 moreover has a protective bracket 23 which can likewise be configured as already explained. The protective bracket 23 can in particular have a first leg 24 and a second leg 25, wherein at least one of the legs 24, 25 (but preferably both legs 24, 25, as described in the exemplary embodiments above) extends integrally, so as to proceed from the main body 2, and wherein the latching installation 8 is disposed between the legs 24, 25 and is bridged by the protective bracket 23 in order for said latching installation 8 to be mechanically protected. By way of example, the second leg 25 in FIG. 7 is not connected to the main body 2.

At least the leg 24, which is integrally connected to the main body 2, is configured for covering the void 10, which is configured between the latching installation 8 and the main body 2, in at least one covered region V in a transverse direction Q transverse to the longitudinal axis $L_F$. Furthermore, at least one of the legs 24, 25 configures at least one access region Z (this being the second leg 25 in the exemplary embodiment of FIG. 7) by way of which the void 10 is accessible along the transverse direction Q. It can be ensured in this way that one of the access regions Z of the second leg 25 lies opposite the covered region V of the first leg 24 along the transverse direction Q. To this end, the second leg 25 is sufficiently spaced apart from the main body 2, for example, so that the void 10 is accessible in the transverse direction.

It is to be mentioned at this point that the legs 24, 25 in FIG. 7 are disposed so as to be mutually offset axially along the longitudinal axis $L_F$ of the void 10. Such an axial offset is however not absolutely necessary, in particular when one of the legs 24, 25 is anyway spaced apart from the main body 2, as is the case in FIG. 7. The legs 24, 25 of a protective bracket 23 therefore do not have to be mandatorily axially offset in relation to one another and can thus also be disposed on the same axial position along the longitudinal axis $L_F$ of the void 10.

In particular, a plurality of protective brackets 23 which are attached on one side and are offset along the longitudinal axis $L_F$ of the void 10, and in which the first leg 24 and the second leg 25 are alternatingly connected to the main body 2 along the longitudinal axis $L_F$, can also be provided.

Figure 8:
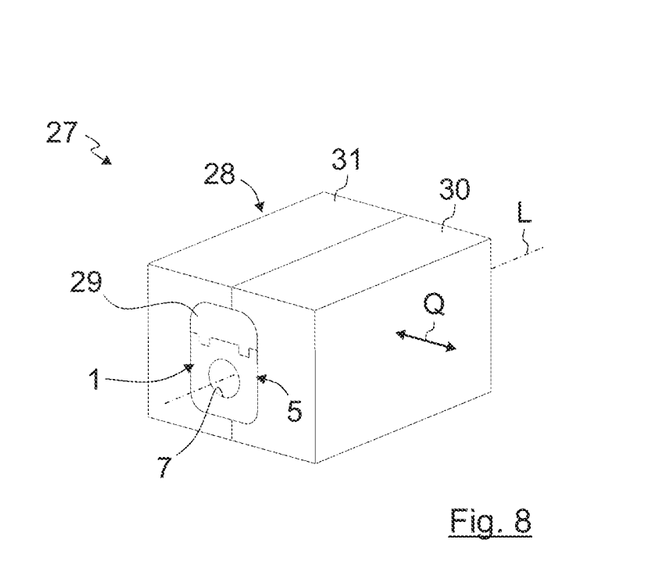
FIG. 8 shows an injection-moulding device according to the invention, having a multiple-part injection-moulding tool in a closed state, for producing a plug connector housing, in a perspective illustration.
Figure 9:
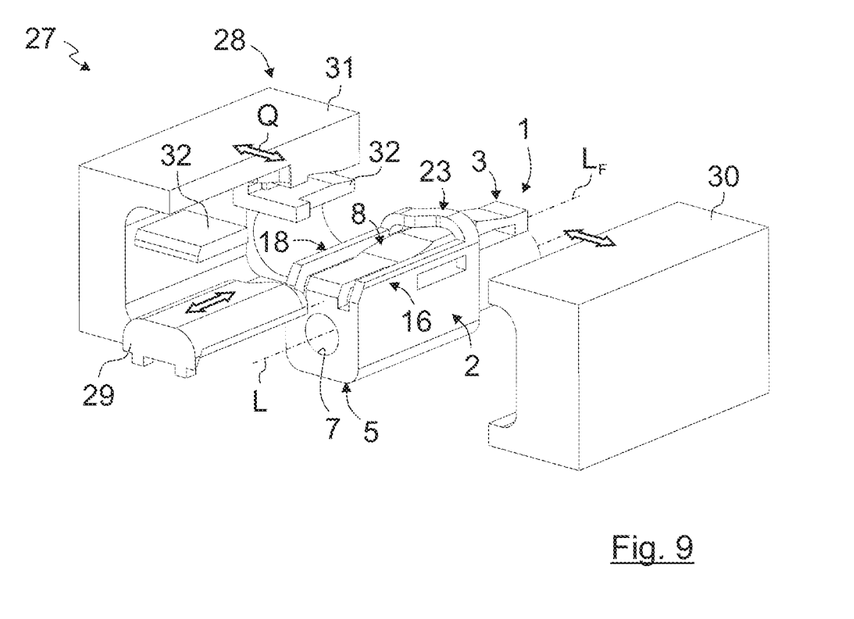
FIG. 9 shows the injection-moulding device of FIG. 8 having an injection-moulding tool which is opened for demoulding the plug connector housing, in a perspective illustration.

Illustrated by way of example in FIGS. 8 and 9 is an injection-moulding device 27 for producing the plug connector housing 1. The plug connector housing 1 by way of example is the plug connector housing 1 of the exemplary embodiment of FIGS. 5 and 6.

The injection-moulding device 27 has a multiple-part injection-moulding tool 28 which in the assembled state thereof (cf. FIG. 8) configures a female mould for the plug connector housing 1, such that, for example, the plug connector housing 1, illustrated in FIGS. 5 and 6, or the alternative plug connector housing 1, shown in FIG. 7, is obtained after the injected, liquid plastics material has solidified. The multiple-part injection-moulding tool 28 is shown in an opened state in FIG. 9, and the plug connector housing 1 has thus been demoulded.

It is to be noted at this point that the clearance 7 configured in the main body 2 for the further plug connector components can in principle be produced in any arbitrary manner, for example by means of a further casting mould, not illustrated in FIGS. 8 and 9, or else by post-machining, for instance by incorporating a bore in the main body 2.

In principle, a first casting mould 29 of the injection-moulding tool 28 for demoulding the plug connector housing 1 can be movable along the longitudinal axis L of the main body 2, or along the longitudinal axis $L_F$ of the void 10, respectively, relative to the plug connector housing 1, so as to demould axial regions between the latching installation 8 and the protective elements 16, 18. This demoulding can preferably be limited to the axial regions between the latching installation 8 and the protective elements 16, 18 in the rear end portion 6 along the longitudinal axis L of the main body 2, because further undercuts may be configured in the region of the interface, or the front end portion 4 of the plug connector housing 1 by the latching hook 12 and optionally existing mechanical coding means (not illustrated), said undercuts requiring demoulding from the sides 15, 17.

The injection-moulding tool moreover has a second casting mould 30 and a third casting mould 31 which for demoulding the plug connector housing 1 are in each case movable in the transverse direction Q relative to the plug connector housing 1 and are disposed so as to be mutually opposite. The second casting mould 30 and the third casting mould 31, proceeding from the respective side 15, 17, enable the portions of the void 10 between the latching installation 8 and the main body 2 that are in each case not covered by the protective element 16, 18 to be demoulded by going through the respective access regions Z. The second casting mould 30 and the third casting mould 31, and particularly preferably moreover also the first casting mould 29, are preferably moved in a temporally synchronous manner.

The second casting mould 30 and the third casting mould 31 can have demoulding regions 32 for the void 10 below the latching installation 8, said demoulding regions 32 engaging in one another in the connected state of the injection-moulding tool 28.

It is to be mentioned at this point that the injection-moulding device 27 illustrated can of course also have even further customary components, for example means for injecting the liquid plastics material, and means for ejecting the plug connector housing 1, tool slides and actuator installations. Since injection-moulding devices 27 are known in principle, these components are not illustrated in FIGS. 8 and 9 for reasons of simplification.

What is claimed is:

1. A plug connector housing for a plug connector, comprising:

a main body made from a plastics material;

a latching installation for mechanically connecting to a corresponding mating latching installation of a mating plug connector, wherein the latching installation has a first connection portion by way of which the latching installation is integrally connected to the main body, wherein a void, which extends along a longitudinal axis on the main body, is at least in portions formed between the latching installation and the main body;

a first protective element and a second protective element which, proceeding from the main body, extend integrally in each case in such a manner that the latching installation is disposed between the protective elements, wherein each one of the protective elements in at least one covered region covers the void configured between the latching installation and the main body in a transverse direction, the latter being transverse to the longitudinal axis; and each one of the protective elements moreover configures at least one access region by way of which the void is accessible along the transverse direction, wherein each one of the covered regions faces a respective access region of the respective other protective element along the transverse direction.

2. The plug connector housing according to claim 1, wherein the latching installation has an elastic spring arm which runs along the longitudinal axis and on which a latching element is disposed, and wherein the void is situated at least between the latching element and the main body so as to, proceeding from a basic state of the spring arm, enable a deflection of the latching element in the direction towards the main body, and wherein the spring arm on a first end, by way of the first connection portion, is integrally connected to the main body and moreover on a second end, facing away from the first end, by way of a second connection portion, is integrally connected to the main body, wherein the void along the longitudinal axis extends across the entire length between the two connection portions.

3. The plug connector housing according to claim 1, wherein at least one of the covered regions of one of the protective elements in addition to the void also at least in regions cover(s) the latching installation in the transverse direction.

4. The plug connector housing according to claim 3, wherein the protective elements, in a front axial end portion that proceeds from a plug-proximal end, do not cover the latching installation in the transverse direction.

5. The plug connector housing according to claim 1, wherein the protective elements have respective elevations which for configuring a respective covered region run along the longitudinal axis, and have elevation-free regions which for configuring a respective access region run along the longitudinal axis.

6. The plug connector housing according claim 1, wherein the protective elements have respective elevations which for configuring a respective covered region run along the longitudinal axis, wherein at least one of the elevations has at least one clearance so as to configure one of the access regions.

7. The plug connector housing according to claim 5, wherein at least one of the elevations is configured as a protective wall or protective web.

8. The plug connector housing according to claim 6, wherein at least one of the clearances is configured as a window (21), concavity or slot.

9. The plug connector housing according to claim 1, further comprising:
a protective bracket which has a first leg and a second leg, wherein the first leg is integrally connected to the first protective element, and the second leg is integrally connected to the second protective element, and wherein the protective bracket extends from the first protective element to the second protective element and bridges the latching installation in order for said latching installation to be mechanically protected.

10. The plug connector housing according to claim 9, wherein the legs of the protective bracket are positioned so as to be mutually offset along the longitudinal axis, wherein the protective bracket between the two legs preferably follows a curved profile.

11. A plug connector housing for a plug connector, comprising:
a main body made from a plastics material;
a latching installation for mechanically connecting to a corresponding mating latching installation of a mating plug connector, wherein the latching installation has a first connection portion by way of which the latching installation is integrally connected to the main body, wherein a void, which extends along a longitudinal axis on the main body, is at least in portions formed between the latching installation and the main body; and
a protective bracket which has a first leg and a second leg, wherein at least one of the legs extends integrally so as to proceed from the main body, and wherein the latching installation is disposed between the legs and is bridged by the protective bracket in order for said latching installation to be mechanically protected, and wherein at least that leg that is integrally connected to the main body in at least one covered region covers the void, which is configured between the latching installation and the main body, in a transverse direction transverse to the longitudinal axis,
the legs are disposed so as to be mutually axially offset along the longitudinal axis of the void such that the void, which in the transverse direction is covered by one of the legs, proceeding from the other leg is accessible along the transverse direction.

12. An injection-moulding method for producing a plug connector housing for a plug connector, comprising at least the following method steps:
providing a multiple-part injection-moulding tool which in the assembled state thereof configures a female mould for the plug connector housing according to claim 1;
moving a first casting mould of the injection-moulding tool along the longitudinal axis relative to the plug connector housing so as to demould axial regions between the latching installation and the protective elements; and
moving a second casting mould and a third casting mould, which lies opposite the second casting mould, of the injection-moulding tool in each case along the transverse direction relative to the plug connector housing so as to demould the void between the latching installation and the main body by going through the access regions.

13. The injection-moulding method according to claim 12, wherein the first casting mould is used exclusively for demoulding the axial regions between the latching installation and the protective elements along the longitudinal axis in a rear axial end portion that proceeds from an output-proximal end.

14. The injection-moulding method according to claim 12, wherein the second casting mould and the third casting mould are moved in a temporally synchronous manner so as to demould the void simultaneously by going through the access regions of all protective elements.

15. An injection-moulding device for producing a plug connector housing for a plug connector, having a multiple-part injection-moulding tool which in the assembled state thereof configures a female mould for the plug connector housing according to claim 1, wherein a first casting mould of the injection-moulding tool for demoulding the plug connector housing is movable along the longitudinal axis relative to the plug connector housing so as to demould axial regions between the latching installation and the protective elements, and wherein a second casting mould and a third casting mould of the injection-moulding tool for demoulding the plug connector housing are in each case movable along the transvers direction relative to the plug connector housing and are disposed so as to be mutually opposite in order for the void between the latching installation and the main body to be demoulded by going through the access regions.

* * * * *